(12) United States Patent
Prichard

(10) Patent No.: US 7,347,641 B2
(45) Date of Patent: Mar. 25, 2008

(54) METHODS AND SYSTEMS FOR JOINING STRUCTURES

(75) Inventor: Alan K. Prichard, Seattle, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 10/814,116

(22) Filed: Mar. 31, 2004

(65) Prior Publication Data

US 2005/0220533 A1     Oct. 6, 2005

(51) Int. Cl.
*F16D 1/00*     (2006.01)
(52) U.S. Cl. ............... 403/408.1; 403/279; 403/274; 411/504; 411/501; 29/524.1; 29/525.06
(58) Field of Classification Search ............ 403/408.1, 403/277, 279; 411/501, 503, 504; 29/524.1, 29/525.06; 244/131, 132
See application file for complete search history.

(56) References Cited

U.S. PATENT DOCUMENTS

| | | | | |
|---|---|---|---|---|
| 2,834,998 | A | * | 5/1958 | Wilder .................. 52/208 |
| 3,001,279 | A | * | 9/1961 | Sherrill .................. 72/41 |
| 3,126,561 | A | | 3/1964 | Orloff |
| 3,169,418 | A | * | 2/1965 | Borowsky .............. 29/509 |
| 3,505,923 | A | * | 4/1970 | Neill .................... 411/501 |
| 3,626,531 | A | | 12/1971 | Mazer et al. |
| 3,848,389 | A | | 11/1974 | Gapp et al. |
| 4,245,921 | A | | 1/1981 | Falcioni |
| 4,556,591 | A | * | 12/1985 | Bannink, Jr. ............ 428/43 |
| 6,375,120 | B1 | * | 4/2002 | Wolnek ................. 244/132 |
| 6,913,225 | B2 | * | 7/2005 | Arulf et al. ............ 403/408.1 |

FOREIGN PATENT DOCUMENTS

DE     101 35 230     7/2001

OTHER PUBLICATIONS

Cherrybuck Features, The Optimum Shear Pin for Automatic Installation; (date unknown) 1 pg.

* cited by examiner

*Primary Examiner*—Robert J. Sandy
*Assistant Examiner*—Michael P. Ferguson
(74) *Attorney, Agent, or Firm*—Perkins Coie LLP

(57) ABSTRACT

One embodiment includes a system of joined structures that includes a first structure having a first aperture in a composite material. The first aperture has a first interior surface and a first minimum radial extent. The system further includes a second structure having a second aperture in a metallic material. The second aperture has a second interior surface and a second minimum radial extent at least approximately the same as the first minimum radial extent. The system still further includes a coupling device having a first shank section extending through the first aperture and a second shank section extending through the second aperture. The portion of the second shank section applies a first radial force to the second interior surface and the first shank section applies at least approximately no radial force to the first interior surface. The composite material proximate to the first aperture is undamaged.

11 Claims, 5 Drawing Sheets

METHODS AND SYSTEMS FOR JOINING STRUCTURES

TECHNICAL FIELD

The following disclosure relates generally to methods and systems for joining structures together, for example, joining two different types of structures with a coupling device.

BACKGROUND

During many manufacturing and repair processes, two pieces of material are joined together using various techniques, including welding, brazing, riveting, and bolting. Riveting is often a preferred technique because it is generally low cost and lightweight. During a typical riveting process, a rivet is placed through a hole drilled through the two materials being joined. The rivet is then expanded, filling the hole. As the rivet expands, it contacts the sides of the hole in each of the materials, applying a radial force to the material. A protruding end or tail of the rivet can also be deformed to hold the rivet in place. Various rivets have been designed over the years, including high-strength hardened rivets having soft tail portions, which can be easily deformed without cracking (as described in U.S. Pat. No. 3,626,531).

When a composite material is riveted to a metallic material (e.g., during the manufacture of an aircraft), the radial force applied to the sides of the hole in the composite material can cause a compression of the composite fibers, damaging the composite and/or leading to delamination. To address this problem, the hole in the metallic material can be made small enough to allow the expanding rivet to contact the metallic sides of the hole (as described above) and the hole in the composite material can be made large enough so that the expanding rivet does not contact the composite sides of the hole, thus avoiding damage to the composite material. While this technique provides a lightweight method of joining the two materials, the requirement to drill two different size holes makes the process time consuming and expensive.

FIG. 1 illustrates an alternative method for fastening a composite material 1 and metallic material 2 with a bolting process. The bolting process allows a single size hole to be drilled through both materials 1, 2. The bolt 3 is placed through the hole and a nut 4 is coupled to the bolt 3. The nut 4 and bolt 3 can grip the materials 1, 2 without expanding into the local composite material 1. The bolt 3, however, is both heavier and more expensive to produce than a rivet. Additionally, while the bolting process is less labor intensive than riveting materials having different hole sizes, the bolting process is more labor intensive than the typical riveting process.

SUMMARY

The present disclosure is directed generally toward structural systems and methods for joining structures together using a coupling device including joining two different types of structures with a coupling device. One aspect of the invention is directed toward a method for joining structures together that can include inserting a coupling device through a first aperture in a first structure and through a second aperture in a second structure. The method can further include positioning the coupling device with a first section of the coupling device extending through the first aperture and a second section of the coupling device extending through the second aperture, but not into the first aperture. The method can still further include applying at least one force to the coupling device to radially expand a portion of the second section of the coupling device extending through the second aperture toward an interior surface of the second aperture, while the first section of the coupling device in the first aperture remains at least approximately unexpanded in a radial direction.

Another aspect of the invention is directed toward a system of joined structures that can include a first structure having a first aperture with a first interior surface and a second structure having a second aperture with a second interior surface. The first aperture can have a minimum radial extent at least approximately the same as a minimum radial extent of the second aperture. The system can further include a coupling device having a first section extending through the first aperture and a second section extending through the second aperture, but not extending into the first aperture. The first section of the coupling device can have at least one of a hardness, toughness, and density greater than that of the second section of the coupling device. A portion of the second section can have a radial extent that is greater than a radial extent of the first section.

Still another aspect of the invention is directed toward a system of joined structures that can include a first structure having a first aperture with a first interior surface and a second structure having a second aperture with a second interior surface. The first aperture can have a minimum radial extent at least approximately the same as a minimum radial extent of the second aperture. The system can further include a coupling device having a first section extending through the first aperture and a second section extending through the second aperture, but not extending into the first aperture. The first section of the coupling device can have at least one of a hardness, toughness, and density greater than that of the second section of the coupling device. A portion of the second section can apply a first radial force to the second interior surface and the first section can apply no radial force to the first interior surface or the first section can apply a second, lesser radial force to the first interior surface.

DETAILED DESCRIPTION

The present disclosure is directed generally toward structural systems and methods for joining structures together using a coupling device. Several specific details of the invention are set forth in the following description and in FIGS. 2A-6 to provide a thorough understanding of certain embodiments of the invention. One skilled in the art, however, will understand that the present invention may have additional embodiments, and that other embodiments of the invention may be practiced without several of the specific features explained in the following description.

Figure 2A:
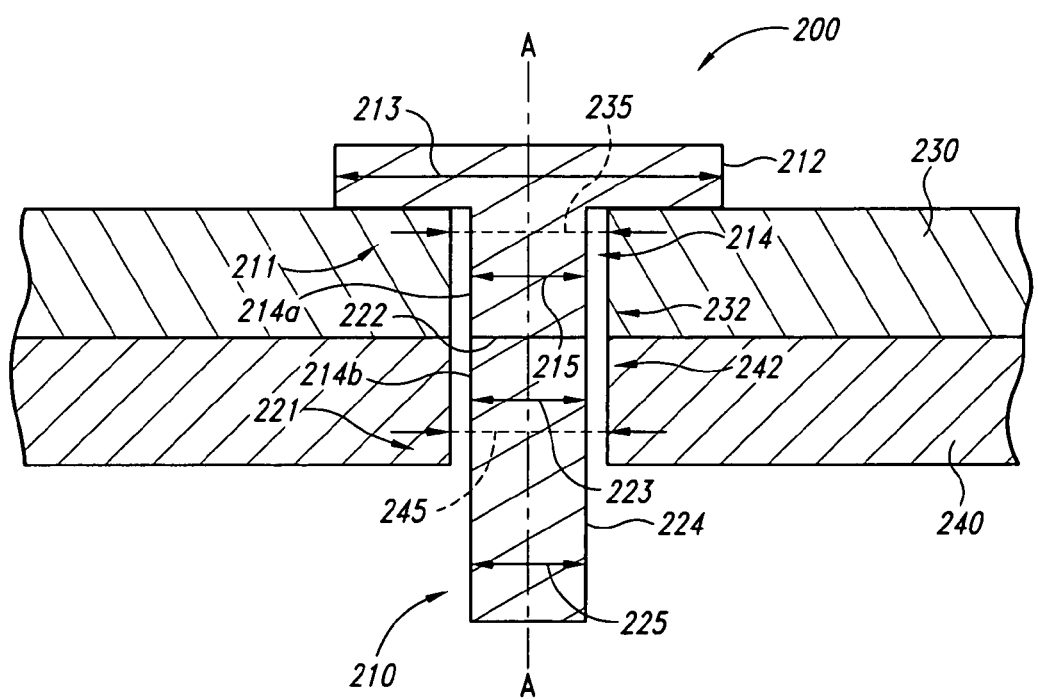
FIG. 2A is a partially schematic cross-sectional view of two structures in the process of being joined by a coupling device in accordance with an embodiment of the invention.

FIG. 2A is a partially schematic cross-sectional view of a structural system 200 having a coupling device 210 (e.g., a rivet) inserted through a first aperture 232 in a first structure 230 and through a second aperture 242 in a second structure 240. The apertures 232, 242 can be intersected by (and in one embodiment, coaxial with) an axis A. The first aperture 232 can have a minimum radial extent 235 (relative to axis A) and the second aperture 242 can have a minimum radial extent 245 (relative to axis A) that is at least approximately the same as the minimum radial extent 235 of the first aperture 232. As described below, the coupling device 210 can couple the first structure 230 to the second structure 240 without imparting a potentially damaging internal radial stress to the first structure 230.

The coupling device 210 can include a generally cylindrical shank 214 elongated along axis A. The coupling device 210 can include a first section 211 on one side of a boundary 222 and a second section 221 on the other side of the boundary 222. The first section 211 can include a head 212 having a radial extent 213 and a first shank portion 214a having a radial extent 215. The second section 221 can include a second shank portion 214b having a radial extent 223 and can further include a tail 224 having a radial extent 225. In the illustrated embodiment, the radial extent 213 of the head 212 is larger than the radial extent 235 of at least a portion of the first aperture 232, preventing the head 212 from passing completely through the first aperture 232.

The coupling device 210 has been positioned with the first section 211 of the coupling device 210 extending through the first aperture 232 and the second section 221 of the coupling device 210 extending through the second aperture 242, but not into the first aperture 232. Accordingly, the boundary 222 can be axially aligned with the interface between the first material 230 and the second material 240 (as shown in FIG. 2A), or the boundary 222 can be below the location shown in FIG. 2A. The coupling device 210 can include metallic (e.g., aluminum) and/or non-metallic (e.g., plastic or composite) materials. The materials can be selected and/or processed to have characteristics that cause at least a portion of the second section 221 to expand radially (when at least one force is applied to the coupling device 210), while the first section 211 remains at least approximately unexpanded or expands by less than does the second section 221. For example, the first section 211 can be harder, tougher, and/or denser than the second section 221. In one embodiment, the first section 211 of the coupling device 210 can include a metallic material that is cold worked and/or heat-treated to make the first section 211 harder than the second section 221. In other embodiments, other techniques can be used, for example, the first section 211 can be made from a harder material than the second section 221 and the two sections can be coupled together to form the coupling device 210. Suitable coupling devices having sections with different characteristics are available from SMI Products and Services of Neumarkt, Germany.

Figure 2B:
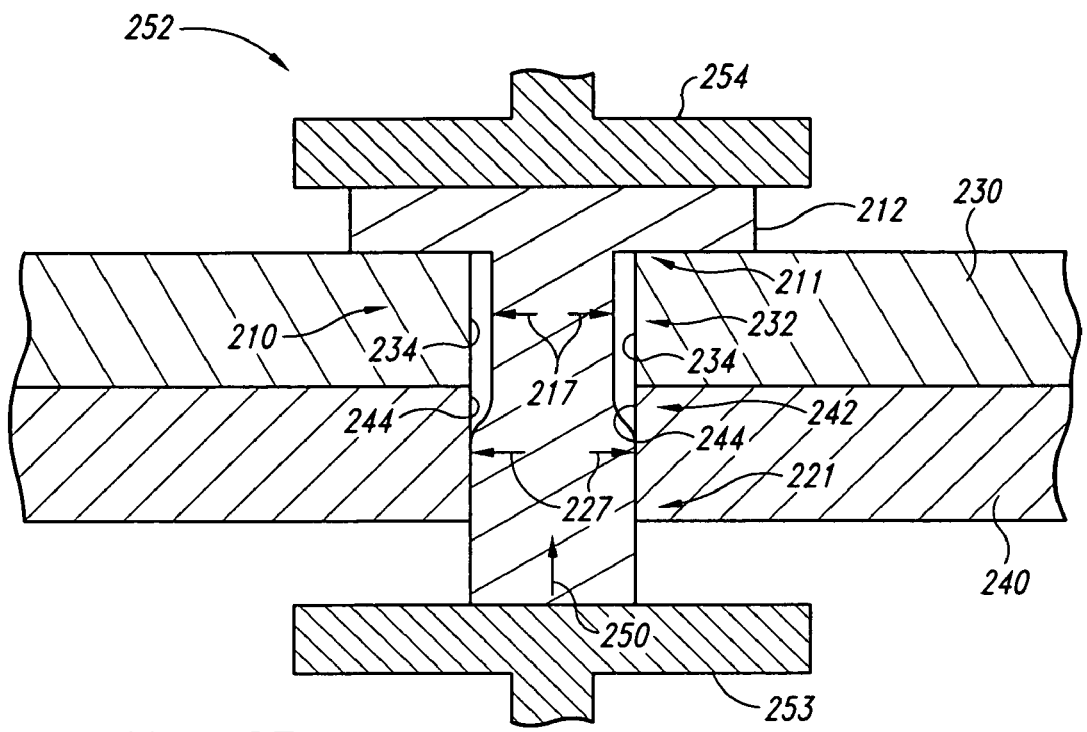
FIG. 2B is a partially schematic cross-sectional view of two structures joined by a coupling device in accordance with an embodiment of the invention.

In FIG. 2B, a force 250 has been applied to the coupling device 210, causing the at least one portion of the second section 221 to expand radially toward an interior surface 244 of the second aperture 242. The radial expansion of the at least one portion of the second section 221 can cause the second section 221 to contact the interior surface 244 of the second aperture 242 and to apply a radial force 227 against the interior surface 244. In this embodiment, the first and second structures are now joined, because the head 212 will not pass completely through the first aperture 232 and the radial force 227 provides a gripping action between the second section 221 and the interior surface 244 of the second aperture 242.

The first section 211 of the coupling device 210 in the first aperture 232 has remained at least approximately unexpanded (e.g., unexpanded, or expanded by a nominal amount) in a radial direction after the application of the force 250. Accordingly, the first section 211 of the coupling device 210 can apply a lesser or zero radial force 217 to an interior surface 234 of the first aperture 232. In an embodiment shown in FIG. 2B, the first section 211 is unexpanded. In other embodiments, the first section 211 can radially expand by a lesser amount than does the second section 221, applying no force to the interior surface 234 of the first aperture 232 if it does not contact the interior surface 234, or applying a non zero force 217 to the interior surface 234 that is less than the force 227 applied by the second section 221.

Because the coupling device 210 expands radially in the second aperture 242 of the second structure 240, but remains at least approximately radially unexpanded in the first aperture 232 of the first structure 230, it can join a composite structure to a metallic structure more effectively and less expensively than can conventional fasteners. For example, in one embodiment, the first structure 230 can include a carbon fiber structure, and the second structure 240 can include an aluminum structure. When the force 250 is applied to the coupling device 210 and causes the second section 221 to expand radially toward the interior surface 244 in the aluminum structure, the first portion 211 in the carbon fiber structure remains at least approximately unexpanded in the radial direction. The head 212 of the coupling device 210 and the radial force 227 applied by the second section 221 of the coupling device 210 can hold the first structure 230 in place relative to the second structure 240 without applying significant (or any) radial forces to the walls 234 of the first aperture 232, and without requiring the first aperture 232 to have a different diameter than that of the second aperture 242.

In any of the above embodiments, the force 250 can be applied in various manners and/or by various force application devices 252, including pneumatic devices, hydraulic devices, and/or electric devices. The devices 252 can include multiple components and/or pieces, and can apply a single force or a series of forces (e.g., impulses). For example, the device 252 can include an electro-impact hammer 253 and a backing plate 254. The hammer 253 can impart at least one acoustical wave to the coupling device 210 in an acoustical upsetting process. In certain embodiments, the frequency of the acoustical wave(s) applied to one end of the coupling device 210 can be adjusted to reflect from the opposite end of the coupling device 210, and the reflected wave(s) can interact with the incoming waves to radially expand at least a portion of the second section 221 of the coupling device 210. Suitable impact hammers are available from Electroimpact Inc. of Kent, Wash.

Figure 2C:
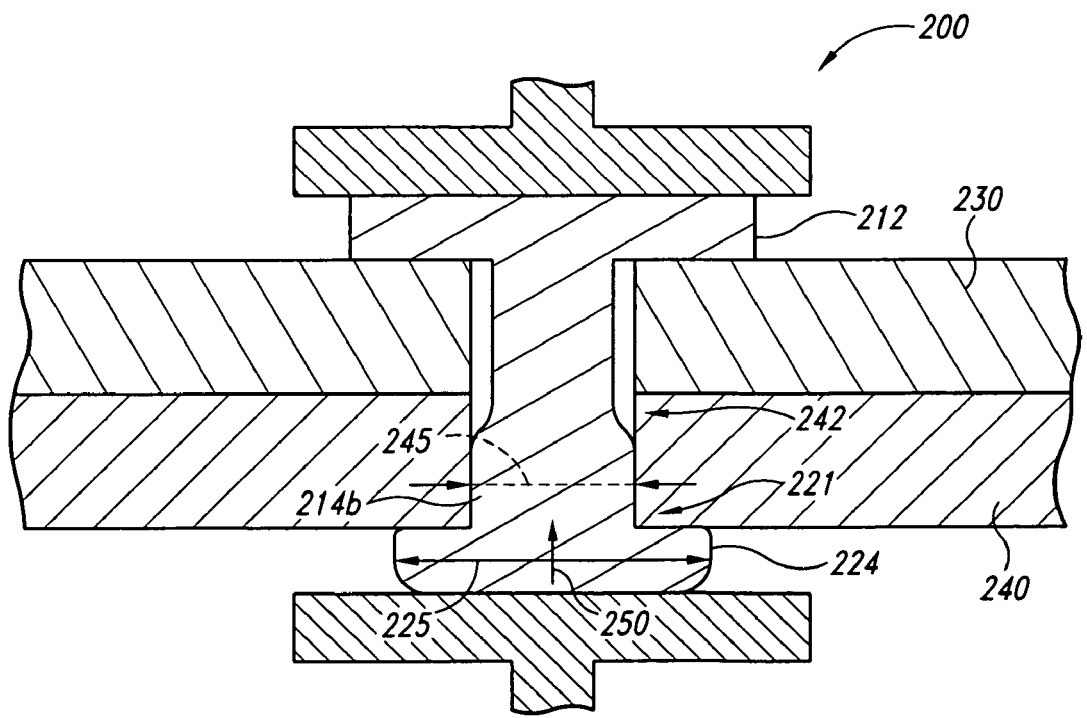
FIG. 2C is a partially schematic cross-sectional view of two structures joined by a coupling device in accordance with a further embodiment of the invention.

FIG. 2C is a partially schematic cross-sectional view of the structural system 200 shown in FIG. 2B after (optional) further processing in accordance with an embodiment of the invention. In one aspect of this embodiment, the force 250 has radially expanded the tail 224 of the second section 221. Under the force 250, a radial extent 225 of the tail 224 has become greater than the radial extent 245 of at least a portion of the second aperture 242. Accordingly, the tail 224 cannot pass completely through the second aperture 242. As a result, the first and second structures 230, 240 can be clamped between the head 212 and the tail 224. In one embodiment, a single force 250 can radially expand both the shank portion 214b and the tail 224. In other embodiments, the force 250 can include several portions (e.g., impulses), some that cause the shank portion 214b to expand radially and others that cause the tail 224 to expand radially.

Figure 3A:
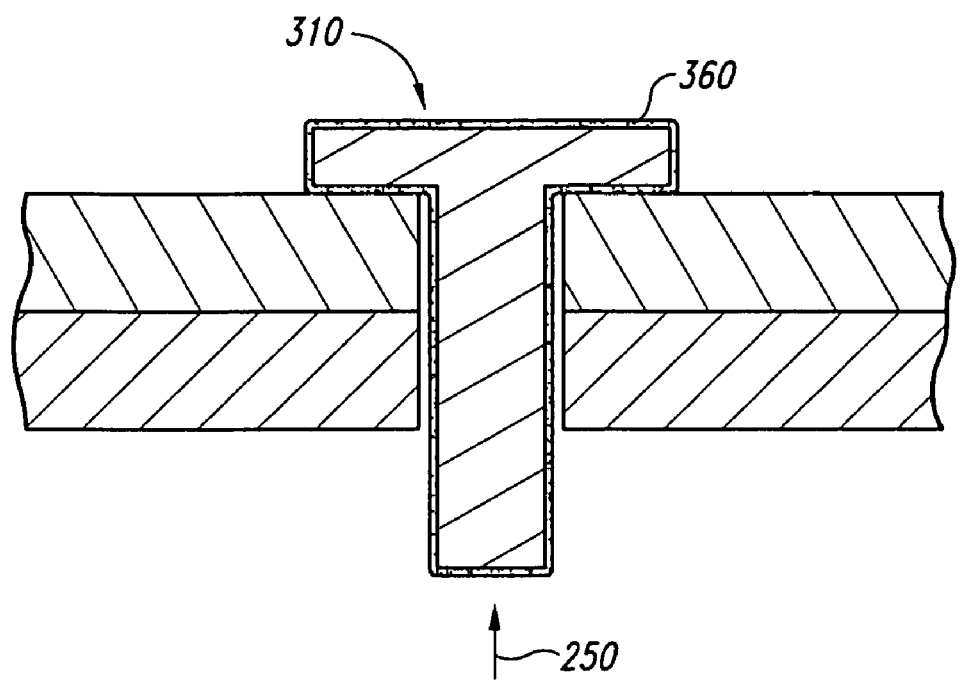
FIG. 3A is a partially schematic cross-sectional view of two structures in the process of being joined together by a coupling device that includes a sealant in accordance with another embodiment of the invention.
Figure 3B:
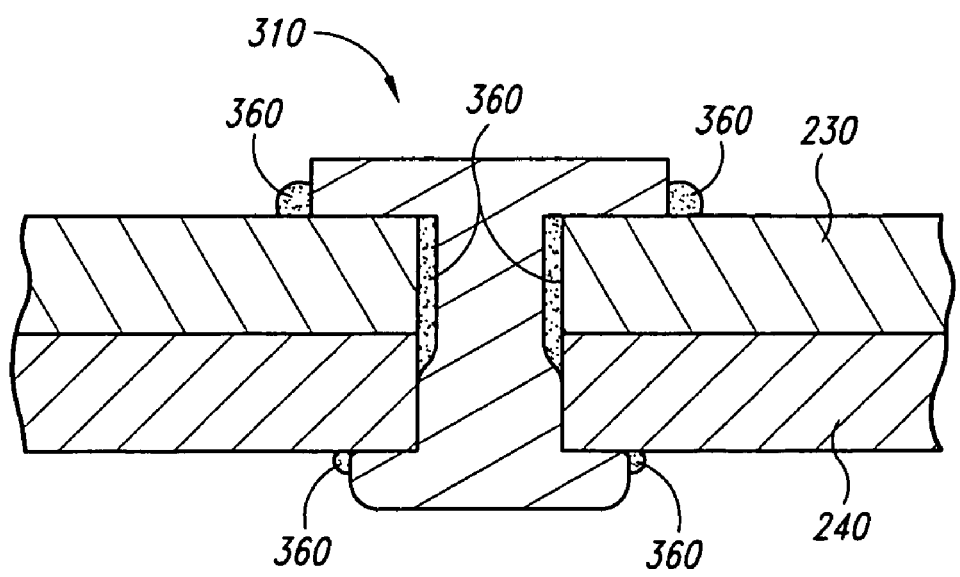
FIG. 3B is a partially schematic cross-sectional view of two structures joined together by a coupling device, with a sealant dispersed proximate to the coupling device in accordance with an embodiment of the invention.

FIG. 3A is a partially schematic cross-sectional view of a coupling device 310 prior to being deformed and sealed in accordance with another embodiment of the invention. The coupling device 310 includes a sealant 360 (e.g., applied as a coating) that is configured to disperse with the application of the force 250. FIG. 3B illustrates the coupling device 310 and the first and second structures 230, 240 after the coupling device 310 has been installed. The force 250 (FIG. 3A) has dispersed the sealant 360 proximate to the coupling device 310, sealing at least a portion of the space surrounding the coupling device 310. Suitable coupling devices coated with sealant are available from SMI Products and Services of Neumarkt, Germany.

Figure 4:
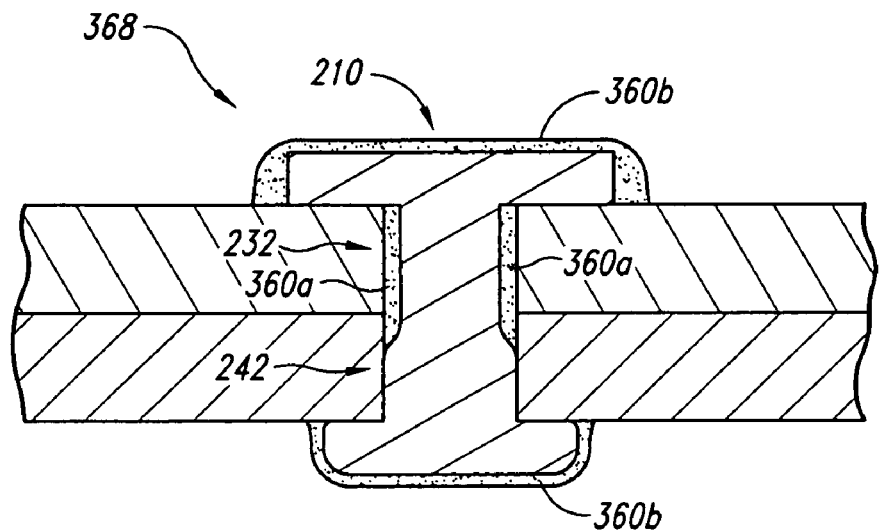
FIG. 4 is a partially schematic cross-sectional view of two structures joined together by a coupling device with a sealant located proximate to the coupling device in accordance with another embodiment of the invention.

As illustrated in FIG. 4, other techniques can be used to apply the sealant 360 proximate to the coupling device 210. These techniques can include applying the sealant 360 into, around, and/or proximate to the first and second apertures 232, 242 before and/or after inserting the coupling device 210 through the first and second apertures 232, 242. The sealant 360 can also be applied before or after deforming the coupling device 210. For example, some sealant 360a can be applied to the first and second apertures 232, 242 before inserting the coupling device 210. An additional sealant 360b can be applied proximate to the coupling device 210.

Figure 5:
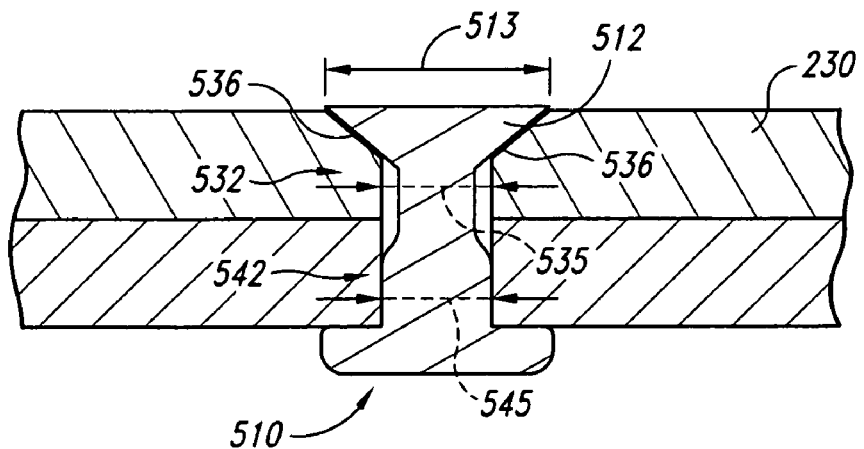
FIG. 5 is a partially schematic cross-sectional view of two structures joined together by a coupling device in accordance with a yet another embodiment of the invention.

In another embodiment shown in FIG. 5, the first structure 230 can include a first aperture 532 having a countersunk portion 536 configured to receive a head 512 of a coupling device 510. The countersunk portion 536 can have flat beveled surfaces or other shaped surfaces, for example, rounded surfaces. Although the countersunk portion 536 receives the head 512 of the coupling device 510, the minimum radial extent 535 of at least a portion of the first aperture 532 is smaller than the radial extent 513 of the head 512, preventing the head 512 from passing completely through the first aperture 532. The minimum radial extent 535 of the first aperture 532 can be at least approximately the same as the minimum radial extent 545 of the second aperture 542, in a manner generally similar to that described above with reference to FIG. 2A.

Figure 6:
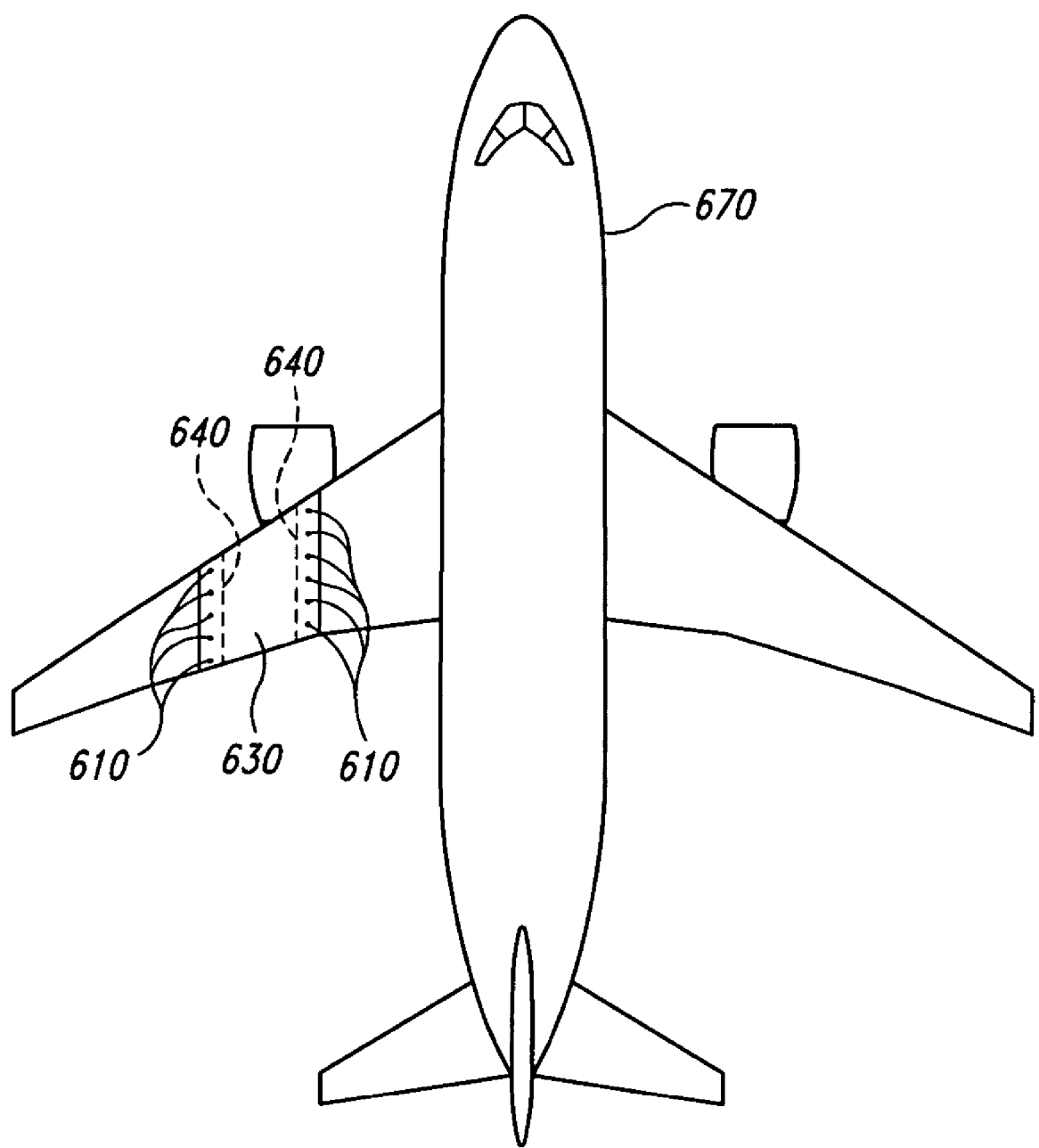
FIG. 6 is a partially schematic view of a structural system that includes a vehicle having structures joined together in accordance with an embodiment of the invention.

Any of the joined structures described above can form portions of a vehicle, for example, an aircraft 670 shown in FIG. 6. The aircraft 670 can have a first structure 630 (e.g., a composite wing panel) joined to two second structures 640 (e.g., supporting structures inside the wing) with multiple coupling devices 610, generally similar to any of those described above with reference to FIGS. 2A-5. In other embodiments, other components can be coupled with the coupling devices 610, and/or the coupling devices 610 can be installed on other vehicles.

Figure 1:
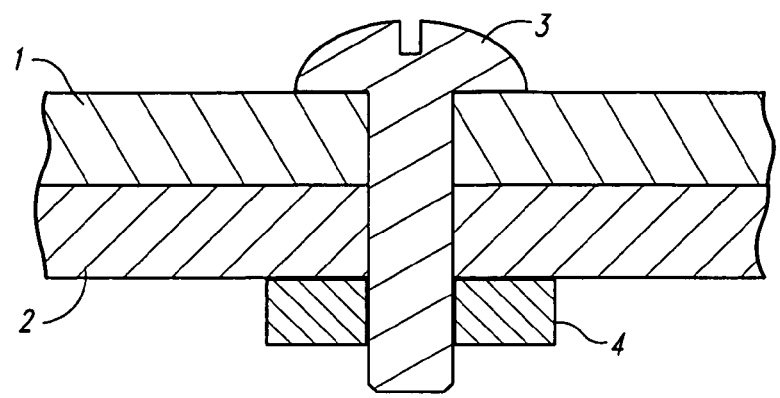
FIG. 1 is a partially schematic cross-sectional view of a nut and bolt used to join two materials in accordance with the prior art.

One feature of embodiments of coupling devices described above is that they can be relatively lightweight, yet strong enough to join a first structure (e.g., a composite structure) that is relatively sensitive to radial forces, to a second structure (e.g., a metallic structure) that is not as sensitive to radial forces. An advantage of this feature is that the structural system can be lighter than a bolted system, including the one described above with reference to FIG. 1. This is particularly important for systems that include aircraft or other vehicles, because lightweight components can improve the performance of the vehicle and reduce the expense incurred in operating the vehicle.

Another feature of embodiments of the coupling devices described above is that they can be less expensive to manufacture than existing nuts and bolts. An advantage of this feature is that it can reduce the manufacturing cost of the system. Additionally, the coupling device can be installed more quickly than conventional nuts and bolts, which can further reduce the manufacturing cost of the system.

Still another feature of embodiments of the coupling devices described above is that they can be used to connect parts having similarly sized apertures. Accordingly, a manufacturer can form holes in both parts using a single tool (e.g., a single drill bit). This feature can still further reduce the costs associated with manufacturing the system.

From the foregoing, it will be appreciated that specific embodiments of the invention have been described herein for purposes of illustration, but that various modifications may be made without deviating from the spirit and scope of the invention. For example, features described above in the context of particular embodiments can be combined or eliminated in other embodiments. Accordingly, the invention is not limited except as by the appended claims.

I claim:

1. A system of joined structures, comprising:

a first structure having a first aperture in a composite material, the first aperture having a first interior surface and a first minimum radial extent, the composite material configured so that a radial force to the first internal surface will damage the composite material;

a second structure having a second aperture in a metallic material, the second aperture having a second interior surface and a second minimum radial extent approximately the same as the first minimum radial extent; and a coupling device having a first shank section extending through the first aperture and a second shank section extending through the second aperture, but not extending into the first aperture, the first shank section of the coupling device having at least one of a hardness, toughness, and density greater than that of the second shank section of the coupling device, wherein:

a portion of the second shank section has a greater radial extent than the first shank section;

the portion of the second shank section applies a first radial force to the second interior surface and the first shank section applies approximately no radial force to the first interior surface;

the composite material proximate to the first aperture is undamaged; and a sealant extending between the interior surface of the first aperture and the first shank section of the coupling device, the sealant rigidly affixing the first shank section of the coupling device to the interior surface of the first aperture.

2. The system of claim 1 wherein the first shank section is not in contact with the first interior surface.

3. The system of claim 1 wherein the coupling device includes a rivet.

4. The system of claim 1 wherein the coupling device includes a metallic material.

5. The system of claim 1 wherein the composite material includes a carbon fiber material and the metallic material includes aluminum.

6. The system of claim 1 wherein the first shank section of the coupling device is connected to a head, and wherein the first aperture includes a countersunk portion for receiving the head.

7. The system of claim 1 wherein the first shank section of the coupling device is connected to a head, and wherein the head has a radial extent greater than a radial extent of at least a portion of the first aperture.

8. The system of claim 1 wherein the second shank section of the coupling device is connected to a tail, the tail extending out of the second aperture, the tail having a radial extent greater than a radial extent of at least a portion of the second aperture.

9. The system of claim 1 wherein:
the first shank section of the coupling device is connected to a head, the head having a radial extent greater than a radial extent of at least a portion of the first aperture; and wherein
the second shank section of the coupling device is connected to a tail, the tail extending out of the second aperture, the tail having a greater radial extent than a radial extent of at least a portion of the second aperture.

10. The system of claim 1 wherein:
the first shank section of the coupling device is connected to a head, the head having a radial extent greater than a radial extent of at least a portion of the first aperture; and wherein
the second shank section of the coupling device is connected to a tail, the tail extending out of the second aperture, the tail having a greater radial extent than a radial extent of at least a portion of the second aperture; and wherein
the first and second structures are clamped together by the head and the tail.

11. The system of claim 1, further comprising a vehicle, and wherein the coupling device, the first structure, and the second structure are installed in the vehicle.

* * * * *